United States Patent
Hansen et al.

(10) Patent No.: US 11,254,622 B2
(45) Date of Patent: *Feb. 22, 2022

(54) NPK-SI-HUMATE FERTILIZER, METHOD FOR PRODUCTION AND USE THEREOF

(71) Applicant: ELKEM ASA, Oslo (NO)

(72) Inventors: Tor Soyland Hansen, Sogne (NO); Magne Dastol, Kristiansand (NO); Odd Skogerbo, Kristiansand (NO); Vladimir Matychenkov, Pushchino (RU)

(73) Assignee: ELKEM ASA, Oslo (NO)

(*) Notice: Subject to any disclaimer, the term of this patent is extended or adjusted under 35 U.S.C. 154(b) by 77 days.

This patent is subject to a terminal disclaimer.

(21) Appl. No.: 16/759,946

(22) PCT Filed: Nov. 20, 2018

(86) PCT No.: PCT/NO2018/050283
§ 371 (c)(1),
(2) Date: Apr. 28, 2020

(87) PCT Pub. No.: WO2019/098854
PCT Pub. Date: May 23, 2019

(65) Prior Publication Data
US 2020/0339485 A1   Oct. 29, 2020

(30) Foreign Application Priority Data
Nov. 20, 2017  (NO) .................................. 20171849

(51) Int. Cl.
*C05G 1/00* (2006.01)
*C05G 5/12* (2020.01)
(Continued)

(52) U.S. Cl.
CPC ................ *C05G 1/00* (2013.01); *A01C 21/00* (2013.01); *C05B 17/00* (2013.01); *C05C 3/005* (2013.01);
(Continued)

(58) Field of Classification Search
None
See application file for complete search history.

(56) References Cited

U.S. PATENT DOCUMENTS

| 11,021,412 B2* | 6/2021 | Matychenkov ........... C05G 5/12 |
| 2010/0016162 A1* | 1/2010 | Goodwin ............... A01N 59/02 |
| | | 504/187 |

(Continued)

FOREIGN PATENT DOCUMENTS

| CN | 1123262 A | 5/1996 |
| CN | 1817823 A | 8/2006 |

(Continued)

OTHER PUBLICATIONS

International Search Report and Written Opinion for Corresponding International Application No. PCT/NO2018/050283 (11 Pages) (dated Apr. 15, 2019) (11 Pages).

(Continued)

*Primary Examiner* — Wayne A Langel
(74) *Attorney, Agent, or Firm* — Lucas & Mercanti, LLP (57) ABSTRACT

A combined organomineral NPK—Si-humate fertilizer having at least one particulate mineral NPK fertilizer is provided, which has at least one nutrient compound of nitrogen, phosphorous or potassium; and a particulate humic substance based silicon fertilizer, having chelates of monosilicic acid-humate compounds. The application also relates to a method of production of the combined organomineral NPK—Si-humate fertilizer.

25 Claims, 4 Drawing Sheets

(51) Int. Cl.
*C05B 17/00* (2006.01)
*C05C 3/00* (2006.01)
*C05C 9/00* (2006.01)
*C05C 5/00* (2006.01)
*C05D 1/00* (2006.01)
*C05D 9/02* (2006.01)
*C05F 5/00* (2006.01)
*C05F 11/02* (2006.01)
*C05F 11/04* (2018.01)
*A01C 21/00* (2006.01)

(52) U.S. Cl.
CPC .............. *C05C 5/005* (2013.01); *C05C 9/005* (2013.01); *C05D 1/005* (2013.01); *C05D 9/02* (2013.01); *C05F 5/002* (2013.01); *C05F 11/02* (2013.01); *C05F 11/04* (2013.01); *C05G 5/12* (2020.02)

(56) References Cited

U.S. PATENT DOCUMENTS

| | | | |
|---|---|---|---|
| 2010/0018269 | A1 | 1/2010 | Prasad |
| 2010/0275666 | A1 | 11/2010 | Matichenkov |
| 2011/0247378 | A1* | 10/2011 | Begley ................. C05C 3/00 71/8 |

FOREIGN PATENT DOCUMENTS

| | | |
|---|---|---|
| CN | 1923766 A | 3/2007 |
| CN | 101560120 A | 10/2009 |
| CN | 101638345 A | 2/2010 |
| CN | 101704698 A | 5/2010 |
| CN | 101805219 A | 8/2010 |
| CN | 201678607 U | 12/2010 |
| CN | 102408278 A | 4/2012 |
| CN | 102557816 A | 7/2012 |
| CN | 102850146 A | 1/2013 |
| CN | 103113156 A | 5/2013 |
| CN | 103626579 A | 3/2014 |
| CN | 103819283 A | 5/2014 |
| CN | 104151041 A | 11/2014 |
| CN | 104671997 A | 6/2015 |
| CN | 104876702 A | 9/2015 |
| CN | 104892105 A | 9/2015 |
| CN | 104926542 A | 9/2015 |
| CN | 105820012 A | 8/2016 |
| CN | 105837340 A | 8/2016 |
| CN | 105967791 A | 9/2016 |
| CN | 105985158 A | 10/2016 |
| CN | 106866257 A | 6/2017 |
| GB | 1195332 A | 6/1970 |
| RU | 2223250 C2 | 2/2004 |
| RU | 2525582 C2 | 8/2014 |
| RU | 2566684 C1 | 10/2015 |
| VN | 15647 A3 | 8/2016 |
| WO | 2013159707 A1 | 10/2013 |
| WO | 2018169411 A1 | 9/2018 |

OTHER PUBLICATIONS

Search Report for Corresponding Taiwanese Application No. 107140985 (1 Page) (dated Sep. 10, 2019).
Search Report for Corresponding Norwegian Application No. 20171849 (2 Pages) (dated Jun. 6, 2018).

* cited by examiner

NPK-SI-HUMATE FERTILIZER, METHOD FOR PRODUCTION AND USE THEREOF

CROSS REFERENCE TO RELATED APPLICATION

This Application is a 371 of PCT/N02018/050283 filed on Nov. 20, 2018 which, in turn, claimed the priority of Norwegian Patent Application No. 20171849 filed on Nov. 20, 2017, both applications are incorporated herein by reference.

TECHNICAL FIELD

The present invention relates NPK—Si fertilizer products and their use in agriculture, environment protection, detoxification and other areas were effective silicon fertilizers are used. In particular, the present application relates to combined organomineral NPK—Si-humate fertilizer products comprising a high content of silicon in the form of plant-available silicon, and the method for production of such combined organomineral NPK—Si-humate fertilizer products.

BACKGROUND ART

Use of complex fertilizers such as NPK to enhance the growth of plants is widespread, however, its extensive use have also resulted in negative impact on the environment, such as e.g. eutrophia, reduction of soil biota population and diversity, reduction of soil pH, acceleration of soil organic matter decomposition, increased erosion and increased accumulation of toxic elements, for example of heavy metals such as Cd from applied phosphates. Thus, authorities in many countries have introduced restrictions to reduce the amount of fertilizers.

Nitrogen (N), potassium (K) and phosphorus (P) are macro-nutrients, and therefore consumed in larger quantities in plants. The essential effects of the NPK elements in a NPK fertilizer are:

Nitrogen (N): Nitrogen is vital because it is an important component of chlorophyll, the compound by which plants use sunlight energy to produce sugars from water and carbon dioxide (i.e., photosynthesis). It is also a major component of amino acids, the building blocks of proteins. Without proteins, plants wither and die. Some proteins act as structural units in plant cells while others act as enzymes, which is crucial for numerus biochemical reactions. Nitrogen is a component in the energy-transfer compounds, such as ATP (adenosine triphosphate). ATP allows cells to conserve and use the energy released in metabolism. Finally, nitrogen is a significant component of nucleic acids such as DNA, the genetic material that allows cells (and eventually whole plants) to grow and reproduce. In simple terms, nitrogen promotes plant growth.

Phosphorus (P): Phosphorous is an important component in plant DNA and RNA. Phosphorus is also important for development of roots, flowers, seeds, fruit, energy for the plant and for uptake of other elements, including N.

Potassium (K): Potassium is important for strong stem growing, movement of water and for uptake of other elements, including N, in plants. Potassium also plays a critical physiological role in carbohydrate and protein metabolism of plants, promotes flowering and fruiting.

Straight fertilizers such as Calcium Ammonium Nitrate (CAN), Ammonium Nitrate (AN), Ammonium Sulphate (AS), Urea, Single Superphosphate (SSP), Triple Superphosphate (TSP), Potash (Potassium Chloride) (MOP) and combined types such as Mono-Ammonium Phosphate (MAP), Di-Ammonium Phosphate (DAP) are well-defined products made using well-defined processes.

Compound or complex fertilizers such as NPK, are more difficult to define as there is an infinite number of N/P/K-ratios and the processes applied in their production are numerous. The product name "NPK" is normally followed by three numbers to indicate the percent of N, P (declared as $P_2O_5$) and K (declared as $K_2O$) which the product contains, e.g. 24-6-12 indicates that this particular grade contains 24% N (nitrogen compounds), 6% $P_2O_5$ (phosphorus compounds) and 12% $K_2O$ (potassium compounds).

In addition, the fertilizer may contain magnesium, boron, sulphur, micro-nutrients, etc. The typical content of nutrients (labelled as $N+P_2O_5+K_2O$) will normally be in the range of 40-60%. Grades with no $P_2O_5$ or no $K_2O$ are also included in the "NPK" product range, however also commonly named NP and NK fertilizers. The most widespread NPK fertilizers in Europe contain nitrate and/or ammonium salts. Table 1 shows typical average range of nutrient content in commercially available NPK fertilizers.

NPK fertilizers can be produced in four, basically different, ways (ref "Best Available Techniques for Pollution Prevention and Control in the European Fertilizer Industry, Booklet No. 8 of 8: "PRODUCTION OF NPK FERTILIZERS by the MIXED ACID ROUTE" Copyright 2000—EFMA, which is hereby incorporated by reference):

- Ammonium phosphate/ammonium nitrate-based NPK fertilizers
- Nitrophosphate-based NPK fertilizers (mixed acid route)
- Nitrophosphate-based NPK fertilizers (ODDA-route)
- Mechanical blending of single or multi-nutrient components.

TABLE 1

Average range of nutrient content in commercially available NPK fertilizers (ref. International Fertilizer Association)

| Common names | N | $P_2O_5$ | $K_2O$ | S | MgO |
|---|---|---|---|---|---|
| Nutrients as % of product | | | | | |
| *Nitrogen fertilizers* | | | | | |
| Ammonia | 82 | 0 | 0 | 0 | 0 |
| Ammonium sulphate | 21 | 0 | 0 | 23 | 0 |
| Ammonium nitrate | 33-34.5 | 0 | 0 | 0 | 0 |
| Calcium ammonium nitrate | 20.4-27 | 0 | 0 | 0 | 0 |
| Urea | 45-46 | 0 | 0 | 0 | 0 |
| *Phosphate fertilizers* | | | | | |
| Single superphosphate | 0 | 16-20 | 0 | 12 | 0 |
| Triple superphosphate | 0 | 46 | 0 | 0 | 0 |
| Diammonium phosphate | 18 | 46 | 0 | 0 | 0 |
| Monoammonium phosphate | 11 | 52 | 0 | 0 | 0 |
| Ground rock phosphate | 0 | 20-40 | 0 | 0 | 0 |
| *Potash fertilizers* | | | | | |
| Muriate of potash (potassium chloride) | 0 | 0 | 60 | 0 | 0 |
| Sulphate of potash | 0 | 0 | 50 | 18 | 0 |
| Sulphate of potash magnesia | 0 | 0 | 22-30 | 17-22 | 10-11 |
| *Complex fertilizers* | | | | | |
| NPK fertilizers | 5-25 | 5-25 | 5-25 | * | * |
| NP fertilizers | 15-25 | 15-25 | 0 | * | 0 |
| NK fertilizers | 13-25 | 0 | 15-46 | * | 0 |
| PK fertilizers | 0 | 7-30 | 10-30 | * | * |

* some with S and/or Mg and/or micronutrients

It should be noted that other methods for labeling NPK fertilizers exists, e.g. there is a standard using the element values, i.e. the amount of elemental N, P and/or K.

Plants mainly take up nutrients in the form of ions. Nitrogen is taken up as ammonium and nitrate. Potassium, as well as other metal cation nutrients, is taken up as ions. Phosphorous is mainly taken up as phosphates (hydrogen phosphates and dihydrogen phosphates). Boron is not taken up as a charged ion, but rather as boric acid.

Silicon (Si) has traditionally been considered as beneficial. Many cultivated plants take up more Si than N, P or K (Epstein, E. (2001) "Silicon in plants: facts vs. concepts", *Studies in Plant Science*, 8, 1-15). In 2004 it was discovered that plant has active transport of this element (Ma, J. F., et al. (2006) "A silicon transporter in rice", *Nature*, 440 (7084), 688). During the recent years, the importance and value of Si as a nutrient in crop has been recognized, especially to stimulate growth of Si-accumulating plants such as rice and sugar canes, and there are many reports related to the role of Si in nutrition of plants ("A Review of Silicon in Soils and Plants and Its Role in US Agriculture: History and Future Perspectives", B. S. TUBANA et al., *Soil Science*, Vol. 181, No. 9/10, 2016). In several countries, Si is now classified as a beneficial element for agriculture (Japan, China, USA, South-Korea).

Thus, it is known that silicon may be a highly beneficial element to enhance growth of plants, and prevent negative influence for many stresses. Silicon fertilizing protects plants against biotic (diseases, insect attack) and abiotic stresses (unfavorable climate condition, salt, toxic influence), and reduces the content of mobile Al and heavy metals in soil and total content of Al and heavy metals in the cultivated plants (Meharg C, Meharg A A (2015) "Silicon, the silver bullet for mitigating biotic and abiotic stress, and improving grain quality, in rice?" *Environmental and Experimental Botany*, 120:8-17).

Silicon is the second most abundant element in the earth's crust. However, plants can only take up Si in the form of monosilicic acid, or possibly lower oligomers of monosilicic acid, herein also denoted as bio-available Si or plant-available Si. Solutions of monosilicic acid are not thermodynamically stable, but will over time lead to polymerization of the monosilicic acid into polysilicic acid, and the Si becomes bio-unavailable. In natural Si containing minerals, the Si is predominantly present in crystalline form or bound with other elements as silicate minerals with low solubility and hence less accessible to the plants through the weathering of the minerals.

The most common and widespread Si-fertilizers used are slags, i.e. byproducts from steel and pig iron production, and natural minerals like diatomite, zeolite, vermiculite etc. These suffer from major drawbacks: 1) they are not very effective Si-sources, hence large quantities are needed (for slags typically 1-2 tons/ha/year); 2) slags are also usually contaminated by heavy metals, which may be absorbed by the plants and thus imply a health risk to the population consuming crop fertilized with such slags. Other known silicon fertilizers include potassium silicate, sodium silicate and calcium silicate. The use of alkaline media can increase the solubility of Si-rich silicate materials, however using such alkaline silicate solution has a drawback of high pH, which may be poisonous to the plants. Thus, a high degree of dilution with water (e.g. 1:100) may be required prior to fertilizing with an alkaline silicate solution, adding cost and complexity.

The required high volumes of slag-based and mineral based Si-fertilizers are much higher than the required volume of traditional NPK-fertilizers. Existing practice require two different fertilizing operations when applied by the farmers, and may require high volumes of Si-fertilizer (slag) and separate logistically arrangements as well, which impose both a practical and an economical problem to the farmers. CN 1923766 discloses a NPK composite fertilizer including slag with calcium silicate. However, as stated above, fertilizing with silicate containing slags has some drawbacks. RU 2223250 discloses a complete complex organomineral fertilizer consisting of organic fertilizer, mineral fertilizer NPK and natural zeolite-containing component. The following ratio of components is stated; mineral component NPK:organic component peat:natural zeolite-containing tripolite=(1.7-1.5):(0.65-0.75):(0.65-0.75), respectively. Prepared fertilizer provides plants with all nutrient substances, reduces soil acidity and provides it using by addition to wells without root burning and without deterioration of the yield quality. In RU 2223250 the silicon is added as a natural zeolite-containing tripolite, which is a natural mineral, hence the solubility of silicon is low.

There is a need for an efficient Si-fertilizer which adds Si in a soluble and plant-available form, preferably as monosilicic acid. Studies performed by the present inventors have shown that certain amorphous silica (silicon dioxide, $SiO_2$), such as microsilica, may be highly useful in this regard. The solubility of Si from amorphous silica is much higher than from crystalline silica or Si-minerals. This means that the amount of Si-fertilizers in terms of kg/ha can be substantially reduced. In turn, this may open for making a combined product of Si and NPK-fertilizer.

These and other advantages with the present inventions will become evident in the following description.

SUMMARY OF THE INVENTION

The present invention combines a much more effective and more environmentally friendly Si-fertilizer with NPK fertilizer in one and the same product. The present invention simplifies distribution and usage of Si- and NPK-fertilizers by the farmer. Thus, the present invention provides a more cost effective and hence affordable NPK—Si-fertilizer for a wide range of agricultural products.

The Si fertilizer used in combination with a mineral NPK fertilizer, in the present invention, is a humic substance based Si-fertilizer (hereafter also denoted Si-humate fertilizer) which has a high content of plant-available Si, which is long-time storage stable with respect to the contents of plant-available Si. The Si-humate fertilizer is obtained by the reaction between humic substances and amorphous silica during an alkaline incubation process, and the product formed has a high content of plant-available Si in the form of a monosilicic acid-humate complex. The product can be dried, still maintaining the high level of plant-available Si, which is also long time storage-stable. The residues of the reaction between humic substances and amorphous silica, which do not dissolve during the alkaline incubation process, provide long term positive effect on soil properties and cultivated plant production and quality. By using the present Si-humate fertilizer, having a high content of plant-available Si, the amount of Si-fertilizer (expressed in kg/ha; kilograms per hectare) can be significantly reduced compared with conventional Si-fertilizers.

Thus, the present invention relates to a combined organomineral NPK—Si-humate fertilizer comprising particulate mineral NPK fertilizer and a particulate humic substance based Si-fertilizer comprising monosilicic acid-humate complex. It has been demonstrated that the combined use of a humic substance based silicon fertilizer and a mineral NPK fertilizer has resulted in increased uptake of potassium and phosphorus by the plants. This increased uptake of potassium and phosphorus may result is a less rate of K and P in the NPK recipe, an advantage as suitable resources for potassium and phosphorus, (potash, apatite and/or other phosphate resources), are drastically declining in the world. Another advantage of less use of phosphorus is less spreading of heavy metals, which are commonly contaminating phosphate sources.

It has also been demonstrated that the combined NPK—Si-humate fertilizer has resulted in increased crop yield, which indicates an increased uptake of N. The increase in crop yield is at a level which compensate for reduced use of NPK with as much as 30-50% while maintaining crop yield. Results from such novel demonstration may play an important role of environmental impact, such as less soil degradation (increasing Corg (organic carbon) in soil vial additional plant root formation; improvement of soil pH, because equilibrium pH of microsilica is 7, while traditional NPK fertilizer is 4-5; optimize soil biota vial increasing population of *Azotobacter* microorganisms and micorrhiza, increasing soil adsorption capacity and reduction pollutants mobility), less euthrophia (nutrients leaching) and less use of nitrogen, of which a high portion is converted to NOx gases which may lead to global warming. Another advantage identified by the present invention is reduction in use of pesticides. It is also observed that the present combined organomineral NPK—Si-humate fertilizer improves plants ability to build water reservoirs in the plant and thereby is more resistant to drought periods (abiotic stress). By the present combined NPK—Si-humate fertilizer it is thus shown a novel rate of impact on uptake of P and K with impact for stimulating biomass growth. The stimulation of the plant root system increased the plant adsorption for all elements, including K. The increasing of the monosilicic acid concentration can transform plant unavailable P to plant available forms, which also improve cultivated plants P nutrition.

In a first aspect the present invention concerns a combined organomineral NPK—Si-humate fertilizer comprising at least one particulate mineral NPK fertilizer, which comprises at least one nutrient compound of nitrogen, phosphorous or potassium, and a particulate humic substance based silicon fertilizer comprising chelates of monosilicic acid-humate compounds.

In a first embodiment of the present invention the ratio of the at least one particulate mineral NPK fertilizer to the said particulate humic substance based silicon fertilizer is from 10:90 to 90:10, based on the total dry weight of the at least one nutrient compound of nitrogen, phosphorous or potassium contained in the at least one NPK fertilizer, and the humic substance based silicon fertilizer.

In a second embodiment of the present invention the mineral NPK fertilizer contains at least one of the following nutrient compounds:
(a) nitrogen (N), in the form of nitrate ($NO_3^-$), ammonium ($NH_4^+$) and/or urea ($CO(NH_2)_2$); (b) phosphorous (P), in the form of phosphate ($PO_4^{3-}$), hydrogen phosphate ($HPO_4^{2-}$) and/or dihydrogen phosphate ($H_2PO_4^-$); and/or (c) potassium (K), in the form of potassium salt ($K^+$).

In a third embodiment of the present invention the humic substance based silicon fertilizer is obtained by incubation of an aqueous suspension comprising 45-90% by weight of a humic acid-containing raw material, 5-50% by weight of amorphous silica, and 0.5-10% by weight of an alkali, the amounts being based on the total weight of the dry components, followed by drying until a residual moisture of less than 15% by weight.

In a fourth embodiment of the present invention the humic substance based silicon fertilizer comprises undissolved residues of the humic acid-containing raw material and undissolved residues of the amorphous silica.

In a sixth embodiment of the present invention the humic acid-containing raw material is selected from the group; coal, charcoal, brown coal, peat and humic soil, or a mixture of thereof.

In a seventh embodiment of the present invention the amorphous silica is selected from the group; microsilica, diatomaceous earth, rice husk ash and zeolites, or a mixture thereof.

In an eight embodiment of the present invention the alkali is chosen from the group an alkali metal hydroxide, an alkaline earth metal hydroxide or a mixture thereof.

In a ninth embodiment of the present invention the ratio of the at least one particulate mineral NPK fertilizer to the said humic substance based silicon fertilizer is from 20:80 to 80:20, based on the total dry weight of the at least one nutrient compound of nitrogen, phosphorous or potassium contained in the at least one NPK fertilizer, and the humic substance based silicon fertilizer.

In a tenth embodiment of the present invention the at least one particulate mineral NPK fertilizer is in the form of a compound fertilizer containing nutrient compounds of N, P and K;
N and P; P and K; and/or N and K; and/or
in the form of single nutrient fertilizer containing compounds of N, P and/or K.

In an eleventh embodiment of the present invention the at least one mineral NPK fertilizer is in the form of granules, prills, extrudates, pellets or agglomerates.

In a twelfth embodiment of the present invention the content of nitrogen nutrient in the at least one NPK fertilizer is up to about 46 weight-% in terms of elemental N.

In a thirteenth embodiment of the present invention the content of phosphorous nutrient in the at least one NPK fertilizer is up to 55 weight-% in terms of $P_2O_5$.

In a fourteenth embodiment of the present invention the contents of potassium nutrient in the at least one NPK fertilizer is up to weight-62% in terms of $K_2O$.

In a fifteenth embodiment of the present invention the NPK—Si-humate fertilizer product also comprises additional nutrients chosen from the group: calcium (Ca), sulphur (S) and magnesium (Mg), and/or micronutrients chosen from the group: zinc (Zn), copper (Cu), iron (Fe), boron (B) and molybdenum (Mo).

In a sixteenth embodiment of the present invention the organomineral NPK—Si-humate fertilizer is in the form of a physical mixture or blend of the at least one particulate mineral NPK fertilizer and the particulate humic substance based silicon fertilizer.

In a seventeenth embodiment of the present invention the organomineral NPK—Si-humate fertilizer is in the form of granules, prills, pellets, extrudates or agglomerates.

In a second aspect the present invention concerns a method for producing a combined organomineral NPK—Si-humate fertilizer according to the first aspect and any of the above first to seventeenth embodiments; comprising
providing at least one particulate NPK mineral fertilizer, which comprises at least one nutrient compound of nitrogen, phosphorous or potassium;
providing a particulate humic substance based silicon fertilizer, which is obtainable by preparing an aqueous suspension comprising 45-90% by weight of a humic acid-containing raw material, 5-50% by weight of amorphous silica, and 0.5-10% by weight of an alkali, the amounts being based on the total weight of the dry components, incubating the aqueous suspension, and thereafter drying the incubated suspension until a residual moisture of less than 15% by weight, and mixing the said at least one particulate NPK mineral fertilizer and the said particulate humic substance based silicon fertilizer.

In a first embodiment of the method the at least one particulate mineral NPK fertilizer and particulate humic substance based silicon fertilizer are provided in a ratio such that the ratio of the at least one particulate NPK mineral fertilizer to the said particulate humic substance based silicon fertilizer is from 10:90 to 90:10, based on the total dry weight of the at least one nutrient compound of nitrogen, phosphorous or potassium contained in the at least one NPK fertilizer, and the humic substance based silicon fertilizer.

In a second embodiment of the method the ratio of the at least one particulate mineral NPK fertilizer to the said particulate humic substance based silicon fertilizer is from 20:80 to 80:20, based on the total dry weight of the at least one nutrient compound of nitrogen, phosphorous or potassium contained in the at least one NPK fertilizer, and the humic substance based silicon fertilizer.

In a third embodiment of the method the humic acid-containing raw material is selected from coal, charcoal, brown coal, peat and humic soil, or a mixture of thereof.

In a fourth embodiment of the method the amorphous silica is selected from the group; microsilica, diatomaceous earth, rice husk ash and zeolites, or a mixture thereof.

In a fifth embodiment of the method the alkali is chosen among an alkali metal hydroxide, an alkaline earth metal hydroxide or a mixture thereof.

In a sixth embodiment of the method the at least one particulate mineral NPK fertilizer contains at least one of the following nutrient compounds:

(a) nitrogen (N), in the form of a nitrate ($NO_3^-$), an ammonium ($NH_4^+$) and/or urea ($CO(NH_2)_2$),
(b) phosphorous (P), in the form of a phosphate ($PO_4^{3-}$), hydrogen phosphate ($HPO_4^{2-}$) and/or a dihydrogen phosphate ($H_2PO_4^-$), and
(c) potassium (K), in the form of a potassium salt ($K^+$).

In a seventh embodiment of the method the least one particulate mineral NPK fertilizer and the particulate humic substance based silicon fertilizer is mixed until a homogenous mixture is obtained.

In an eight embodiment of the method the at least one mineral NPK fertilizer is in the form of granules, prills, extrudates, pellets or agglomerates.

In a ninth embodiment of the method the content of nitrogen nutrient in the at least one NPK fertilizer is up to about 46 weight-% in terms of elemental N.

In a tenth embodiment of the method the content of phosphorous nutrient in the at least one NPK fertilizer is up to 55 weight-% in terms of $P_2O_5$.

In a eleventh embodiment of the method the contents of potassium nutrient in the at least one NPK fertilizer is up to weight-62% in terms of $K_2O$.

In a twelfth embodiment of the method the NPK—Si-humate fertilizer product also comprises additional nutrients chosen from the group: calcium (Ca), sulphur (S) and magnesium (Mg), and/or micronutrients chosen from the group: zinc (Zn), copper (Cu), iron (Fe), boron (B) and molybdenum (Mo).

In a third aspect the present invention relates to the use of the combined organomineral NPK—Si-humate fertilizer according to the first aspect, and the first to the seventeenth embodiment of the invention according to the first aspect, for supplying nutrients and/or soil conditioners to agricultural or greenhouse soil.

In a fourth aspect the present invention relates to the use of the combined organomineral NPK—Si-humate fertilizer according to the invention, for supplying nutrients and/or soil conditioners to agricultural or greenhouse soil where the at least one particulate mineral NPK fertilizer, which comprises at least one nutrient compound of nitrogen, phosphorous or potassium; and the particulate humic substance based silicon fertilizer, comprising chelates of monosilicic acid-humate compounds, are applied as separate constituents.

In a further aspect, the present invention relates to a method for supplying nutrients and/or soil conditioners to agricultural or greenhouse soil, comprising applying a combined organomineral NPK—Si-humate fertilizer, according to the present invention.

In a further aspect, the present invention relates to a method for supplying nutrients and/or soil conditioners to agricultural or greenhouse soil, comprising applying a combined organomineral NPK—Si-humate fertilizer according to the present invention, where the at least one particulate mineral NPK fertilizer, which comprises at least one nutrient compound of nitrogen, phosphorous or potassium; and the particulate humic substance based silicon fertilizer, comprising chelates of monosilicic acid-humate compounds, are applied as separate constituents.

DETAILED DESCRIPTION OF THE INVENTION

The present invention provides a combined organomineral NPK—Si-humate fertilizer comprising at least one particulate mineral NPK fertilizer and a particulate humic substance based silicon fertilizer comprising chelates of monosilicic acid-humate compounds, which alleviates at least some of the disadvantages connected with prior art silicon containing fertilizers.

In the present context the term "plant-available Si" and "bio-available Si" should be understood as denoting compounds of silicon which are in a transferable form to be taken up or absorbed by the roots of the plants, that is monosilicic acid, $H_4SiO_4$, commonly noted $Si(OH)_4$, or possibly lower oligomers of monosilicic acid.

Without being bound by the theory, the plant-available Si in the present Si-humate fertilizer is believed to be formed by a complexing reaction between monosilicic acid and derivatives of humic acid dissolved as humates, thereby forming a water-soluble and storage stable monosilicic acid-humate chelate. The chelates formed by complexing reactions prevent the monosilicic acid to polymerize into polysilicic acid, which is a bio-unavailable form of silicon. The thus formed chelates (also denoted complex) are also water soluble, even after drying and longtime storage.

By the term "storage-stable bio-available Si" in the present context, it should be understood that the amount of bio-available Si in the Si-humate fertilizer part is maintained high compared with a freshly produced product, even after longtime storage. As to the term "longtime storage" it should be noted that tests performed by the inventors using the Si-humate fertilizer, having been stored for one year, surprisingly gave approximately the same results, measured in crops yield and Si uptake, as a freshly produced product.

The Si-humate fertilizer may be prepared as described in the following: Mixing 45-95% by weight of a humic acid-containing raw material, 5-50% by weight of an amorphous silica, and 0.5-10% A by weight of an alkali, (said amounts are based on the total weight of the dry components, in an aqueous medium forming an aqueous suspension, incubating the suspension at a temperature between 20-70° C. for a period of at least 1 hour and drying the incubated mixture. The dried product should have a residual moisture content between 5-15% by weight.

In the present context the term "incubating" may also be interpreted as leaching and/or maturing. Incubating is denoting the process step wherein the alkaline aqueous suspension is left for a time and at a temperature wherein the raw materials are leached in the alkaline solution. Further, the complexing reactions between dissolved monosilicic acid and humic acid takes place during the incubation.

The humic acid-containing raw material may be any humic substances. The preferred humic acid-containing raw materials advantageously have a high content of humic acid. Examples of such humic substances having a high content of humic acid are different types of coal, such as e.g. brown coal (lignite, leonardite), peat and humic soil. The amount of humic acid-containing raw material should be from 45-95% by weight, based on the total content of the dry materials. In an embodiment the amount of humic acid-containing raw material may be between 60-90% by weight, e.g. 75-85% by weight. The amount of humic acid-containing raw material added in the mixture may rely on e.g. the content of humic acid in the raw material. The humic acid-containing raw material should be grounded to a fine powder, particle of mm size, e.g. 0.1-3 mm, to increase the reaction kinetics.

The amorphous silica suitable for the method of production of the humic substance based Si-fertilizer, according to the present invention, may be a low cost silica selected from the group; microsilica, diatomaceous earth, rice husk ash, perlite, zeolites and Ca-silicate minerals or a combination of these. Amorphous silica is preferred silica source because it has a much higher solubility compared to crystalline forms of silica, which is already present in the soil. The preferred amorphous silica are microsilica and rice husk ash because these have a high specific surface area which increases the dissolution rate of silica (provided it is available to the alkaline solution) to the desired monosilicic acid. An amorphous silica suitable for the present invention should have a specific surface area about 5-50 $m^2/g$ (BET), and a particle size in the nano or micron area, e.g. 0.01-50 µm, preferably less than 5 µm. The morphology and particle size distribution of the amorphous silica should be uniform, as this favors uniform dissolution of the particles in the alkali aqueous suspension. Microsilica (also known as silica fume) is advantageous as it is available with uniform morphology and particle size distribution within a narrow range, as well as a suitable high specific surface area. The term "microsilica" used in the specification and claims of this application refer to particulate, amorphous $SiO_2$ which may be obtained from a process in which silica (quartz) is reduced to SiO-gas and the reduction product is oxidized in the vapor phase to form amorphous silica. Microsilica may contain at least 70% by weight silica ($SiO_2$), and preferably >95% by weight $SiO_2$, and has a specific gravity of 2.1-2.3 $g/cm^3$ and a specific surface area of 5-50 $m^2/g$ (BET), typically 20 $m^2/g$. The primary particles are substantially spherical and may have an average size of about 0.15 µm, as calculated by volume. Microsilica is preferably obtained as a co-product in the production of silicon alloys in electric reduction furnaces, but may also be (co)-produced in other processes. In the following description of the present invention the amorphous silica is microsilica, it should however be noted that the amorphous silica may be other types, as stated above.

The amount of amorphous silica added to the mixture for preparing the Si-humate fertilizer is 5-50% by weight. In an embodiment the amount of amorphous silica is between 10-30% by weight, e.g. 15-25% by weight.

The alkali should be a strong base such as alkali metal hydroxide, such as NaOH and KOH, an alkaline earth metal hydroxide, such as $Ca(OH)_2$, or a mixture thereof. The alkali may be added to the mixture as a solid material. The alkali neutralizes the humic acid in the humic acid containing raw material, thus bringing them to a water soluble form as humates. The alkali also dissolves a significant amount of the amorphous silica. The primary reaction product is monosilicic acid, $Si(OH)_4$. The amount of alkali added to the mixture is between 0.5-10% by weight. Normally the amount of alkali added is less than the stoichiometric amount necessary to dissolve all silica and to convert all humic acid. However, the amount of alkali provides sufficient bio-available Si and humates for germination and initial growth period. The surplus amorphous silica will act as a slow release source, thus providing sufficient fertilizing in the later growth periods. The initial pH in the suspension, before incubation, should be at least 9.5, and may be even as high as 13.

The amount of water in the aqueous suspension should be more than the necessary (stoichiometric) amount for the reactions, the maturation during incubation and the chelate formations. The aqueous suspension should preferably have a water content such that the suspension is stirrable and preferably also flowable, to be transportable e.g. by pumping. Thus, the amount of water may be 25-70% by weight, based on the total weight of the suspension. However, the dispersion should not contain too much water, as this will increase the energy demand for removing water in the drying step. Thus, the water content is normally not more than about 50% by weight, based on the total weight of suspension. The water content is preferably from 25-40% by weight, based on the total weight of the suspension.

Any suitable mixer may be used for preparing the aqueous suspension, e.g. a dispersion mixer. Typically the humic acid containing raw material and the amorphous silica source are mixed before addition of water and the alkali. This mixing sequence is however not mandatory as any mixing sequence may be used. The thus obtained mixture should be thoroughly mixed into a homogenous suspension, thereby forming an alkaline suspension of dissolved and undissolved constituents. The suspension is left for incubation for a time and a temperature, where the humic acid and the amorphous silica are partly dissolved, under the formation of humates and monosilicic acid. Without being bound by the theory it is believed that, as monosilicic acid is formed, the monosilicic acid is chelated by a complexing reaction with the water-soluble humates. Monosilicic acid chemically bound as chelates with humates are prevented from polymerization into polysilicic acid. Thus, the silicon is bound and remains in a bio-available form.

The incubation temperature is preferable between 20 to 70° C. The incubation time should be from 1 hour to several days. Incubation time at normal temperatures, i.e. ambient temperatures, is typically from 2 to 7 days. An incubation time between 3-5 days at normal (ambient) temperatures will typically be sufficient for leaching and complexing reactions. During the incubation the pH of the aqueous suspension will decrease from more than 9.5, or even higher, towards a neutral pH of about 6.5-7. Experiments show that similar effects, as for prolonged incubation time at ambient temperatures, may be obtained by a combination of an elevated temperature and agitation. In this case the incubation time may be reduced to a few hours, e.g. incubating at 50-60° C. for about 24 hours. In general, elevating incubation temperatures will reduce the incubation time. Agitation and/or stirring of the suspension during incubation may also promote homogenization and solubilization of monosilicic acid and humic acids, and thus reduce the incubation time. An optimized combination of agitation, temperature and alkaline may reduce incubation time to just about an hour. After incubation the suspension will typically have a pH of about 6.5-7.

The incubated suspension is typically dried by heating to a product temperature between 15 and 95° C., to obtain a product having a residual moisture content of less than 15% by weight. The drying step may be performed in open air, or by use of any conventional drying equipment, possibly including heating means, to reduce the water content. When drying in open air, the drying time is depending on the air humidity and temperature. A residual moisture content in the product of about 10% are in most cases suitable, however it should be noted that the water content may deviate from this specific amount. The product should not be completely dried, as such drying may transform the monosilicic acid chelates to silica, which is a bio-unavailable form of Si. The dried product may be crushed and sieved as required, and/or granulated, to produce a product that is easy to handle and use, and compatible for mixing with a NPK fertilizer.

In the present context the term "NPK", "NPK fertilizer" and "NPK mineral fertilizer" should be understood to denote NPK macronutrient fertilizers, which are generally known in the field. Such NPK fertilizers are generally labeled with an NPK analysis, based on the relative content of the chemical elements N (nitrogen compounds), P (elemental or phosphorus compounds) and K (elemental or potassium compounds), and any other nutrients when present. The content of the nutrients have traditionally been declared as N for nitrogen content; $P_2O_5$ for phosphorous and $K_2O$ for potassium, but it should be noted that the declaration of the nutrient can also be declared as content of element, and possibly other ways. The NPK fertilizers according to the present invention may comprise the three major nutrients N, P and K; two major nutrients (binary fertilizer, NP, NK, PK); or only one of the major nutrient, also denoted straight or single nutrient fertilizers, including compounds of one of N, P and K. It should be understood that the N, P and K nutrients are present in the form of compounds in the fertilizer, as generally known in the art. The NPK fertilizer according to the present invention thus contains at least one of the following nutrients:

Nitrogen (N), in the form of nitrates ($NO_3^-$), ammonium ($NH_4^+$) and/or urea ($CO(NH_2)_2$); Phosphorous (P), in the form of a hydrogen phosphate ($HPO_4^{2-}$) and/or a dihydrogen phosphate ($H_2PO_4^-$) and/or phosphate ($PO_4^{3-}$); and Potassium (K), in the form of a potassium salt ($K^+$).

NPK fertilizers suitable for the present invention may also comprise one or more secondary nutrients (Ca, S and Mg) and/or micro nutrients (Fe, Mn, Zn, B, Cu, Mo and Cl), as generally known in the field. Fertilizers may contain fillers, and various fillers are available in the fertilizer industry. The fillers are normally inactive, i.e. not a nutrient, but may improve soil properties, The fillers often have a role for improving the stabilization of the fertilizer product during storage and handling (e.g. anticaking agents). Good quality mineral NPK fertilizers consist almost entirely of the nutrient compounds, and only very small amounts of additives e.g. anticaking agents and filler. Therefore a straight NPK fertilizer such as ammonium nitrate consists substantially of the ammonium and nitrate, which are the forms of nitrogen nutrient that are taken up by the plants. Correspondingly, straight P or K NPK fertilizer will substantially consist of the respective nutrient compositions. The same also applies for NPK fertilizers containing two of the major nutrients and NPK fertilizers comprising all three major fertilizers.

In the NPK—Si-humate fertilizer according to the present invention, wherein the ratio of the at least one particulate mineral NPK fertilizer to the particulate Si-humate fertilizer is from 10:90 to 90:10, based on the dry weight of the product, the relative amount of the NPK fertilizer portion is to be based on the sum of the nutrient compounds (i.e. any present nitrogen compounds, phosphorous compounds and potassium compounds in the at least one NPK fertilizer) and the Si-humate fertilizer portion. Thus any filler or additive in the NPK fertilizer is not included in the dry weight basis. There exists a wide variety of commercial mineral NPK fertilizer with different amounts of N, P, and/or K nutrient content, with or without filler compounds and any other additive.

NPK fertilizers may be produced as a compound fertilizer, where the ingredients are mixed before being formed into particles. Each particle contains N, P and K, ensuring a homogenous product. The NPK fertilizers may also be produced as a blended fertilizer, which is a physical mixture of dry NPK fertilizer particles normally containing different nutrient compounds.

In a mechanical blending process of single or multi-nutrient NPK components, the process entails a physical blending of the ingredients in dry form. The ingredients are in the form of separate particles, which may have different bulk density and particle sizes. In order to achieve a homogenous and even blend, care must be taken such that segregation and caking of the fertilizer product is avoided. According to the present invention the Si-humate fertilizer is one of the dry blending components thereby producing the inventive organomineral NPK—Si-humate fertilizer.

The combined organomineral NPK—Si-humate fertilizers according to present invention should have ratio of the mineral NPK fertilizer portion, i.e. the at least one nutrient compound of nitrogen, phosphorous or potassium, to the Si-humate fertilizer portion from about 10:90 to 90:10, based on the dry weight of the at least one nutrient compound of nitrogen, phosphorous or potassium, and the Si-humate fertilizer contained in the organomineral NPK—Si-humate fertilizer product. Throughout this specification and in the claims the weight ratio of mineral NPK fertilizer to the Si-humate fertilizer is based on the sum of dry components of the at least one nutrient compounds of nitrogen, phosphorous or potassium in the mineral NPK fertilizer portion, and the Si-humate fertilizer portion contained in the combined NPK—Si-humate fertilizer product according to the present invention. The organomineral NPK—Si-humate fertilizers may be produced in a wide variety of ranges, e.g. the ratio of the mineral NPK fertilizer components to the Si-humate fertilizer may be selected from the ranges; 20:80 to 80:20, from 30:70 to 70:30, from 40:60 to 60:40 or 50:50, based on dry weight of product. It should be noted that the NPK—Si-humate fertilizers according to the present invention may include compounds of all three major nutrients N, P and K; two of the major nutrients (NP, NK or PK), or only one of the major nutrients N, P and K. In general the ratio between the portion of NPK mineral component to the portion of Si-humate fertilizer should be within the defined ranges; 10:90 to 90:10, and subranges 20:80 to 80:20, from 30:70 to 70:30, from 40:60 to 60:40 or 50:50.

If the amount of Si-humate fertilizer in the NPK—Si-humate fertilizer is more than about 90% (based on dry weight of the product), the amount of NPK nutrients in the fertilizer will in most cases become too low to cover the macronutrient requirement, resulting in reduced crop yield and reduced plant health. A Si-humate fertilizer amount of less than about 10% (based on dry weight of the product) will in most cases not cover the silicon nutrient demand of the plants, in addition the beneficial, synergistic effect of the combined NPK—Si-humate fertilizer, such as increased P uptake and increased biomass yield, becomes small. Tests show that a ratio of mineral NPK fertiliser compounds to Si-humate fertilizer between 30:70 and 70:30 (based on dry weight of the product, as defined above) give very good results. The addition of Si-humate fertilizer in combination with traditional NPK mineral fertilizer shows a synergistic effect, especially with respect to increased phosphorous uptake in plants and increased biomass, compared to tests where NPK fertilizer is applied alone (without Si-humate fertilizer).

The NPK—Si-humate fertilizer is preferably in the form of a blended fertilizer. The blended NPK—Si-humate fertilizer may be a physical (mechanical) mixture of a compound NPK fertilizer and Si-humate fertilizer. The blended NPK—Si-humate fertilizer may alternatively be a physical mixture of one, two or three single major NPK nutrients and Si-humate fertilizer, or the major NPK nutrients may be in the form of a NPK fertilizer containing two of the major nutrients (NK, NP or PK) mixed with Si-humate fertilizer. In all the aforesaid circumstances the nutrients to be mixed should be in the form of separate, dry particles. The Si-humate fertilizer should preferably be in the form of agglomerated particles or granulates so as to be compatible with the other ingredients in the blend. The blended NPK—Si-humate fertilizer should have a particle size distribution and bulk density assuring a good quality fertilizer which is not prone to segregation of any of the nutrient particles during handling and application.

In all the above embodiments of the NPK—Si-humate fertilizers according to the present invention, the product may also comprise one or more of secondary nutrients (Ca, S and Mg) and/or micro nutrients (Fe, Mn, Zn, B, Cu, Mo and Cl).

The present NPK—Si-humate fertilizer is used for supplying nutrients and/or soil conditioners to agricultural or greenhouse soil. By the method of applying the present combined NPK—Si-humate fertilizer, according to the present invention, the farmers fertilizing operations are simplified as the Si nutrient is distributed together with the NPK fertilizer in a combined product. Some of the benefits with the fertilizer according to the present inventions are reduction of the volumes of fertilizers to be applied, and more simple logistically arrangements. It should however be noted that the combined NPK—Si-humate fertilizer according to the present invention may be applied as separate constituents, that is NPK fertilizer and Si-humate fertilizer are applied as separate constituents, but used in combination, according to the present invention.

The present invention will be illustrated by the following examples. The examples should not be regarded as limiting for the present invention as these are meant to illustrate different embodiments of the invention and the effect of the usage of the invention.

Examples

In the following examples the mineral NPK fertilizer is denoted "NPK", and the Si-humate fertilizer is denoted "Si Agro A".

Description of Plant Analysis for Phosphorous (P) and Potassium (K):

Three plant samples were collected from each test, washed in distilled water, dried at the temperature+65° C., then ground and passed through 0.1 mm sieve. Microwave digestion of plant samples was used for total P and K analyses. A plant sample of 0.20±0.01 g was predigested in a mixture of 4 mL of concentrated $HNO_3$ and 2 mL of 30% $H_2O_2$ overnight followed by microwave digestion for 30 min. K and P were analyzed by ICP-MS I Cap-Q (USA) according to standard methods.

Description of Plant Analysis for Nitrogen (in the Form of Nitrate):

The soluble forms of $NO_3$ in the apoplast and symplast of roots, stems, and leaves were analyzed using the following technique.

Fresh plant tissue samples 0.20+0.01 g were cut into fragments about 1-2 cm in length and put into a plastic bottle. Then 50 mL of distilled water was added and the mixture was agitated for 24 h to provide diffusion of the apoplast solution into external solution. The mixture was filtered and clean solution was analyzed for $NO_3$ by using compact NO₃ meter (Twin NO₃ Horiba, Japan). The samples of plant tissue after filtering were homogenized to crush all cell walls. Homogenized slurry was mixed with 50 mL of distilled water and agitated for 1 h. As a result, the diluted symplast solution was obtained and analyzed after centrifugation for monosilicic acid and soluble forms of NO₃ by the methods described above. Based on the data on plant tissue moisture, the contents of monosilicic acid and soluble forms of NO₃ were calculated on a dry weight.

Example 1. Production of Si-Humate Fertilizer

Brown coal (BC) and microsilica, 96-97% SiO₂ (MS) was weighted out in a weight ratio 5:1, in total 60 kg. The BC and MS was dry blended for 4 minutes. About 30 liters of water was added to the mixture of BC and MS, and the blending was continued. 0.6 kg KOH powder was added (1% by weight of dry mix), and the mixture was blended another 4 minutes.

The wet mixture (total weight about 90.6 kg) was retained in the mixer for 3 days at ambient temperature (20-25° C.) and blended 3-4 times every day, 4 minutes each time (incubation process). After 3 days incubation process, the mix was dried in open air for 2 days to about 10% water content. The dried cake was put back into the mixer for de-agglomeration.

Tests Using the NPK—Si-Humate Fertilizer According to the Present Invention

In the following examples mineral NPK fertilizer containing 16% N, 16% P and 16% K (elemental analysis) was used, unless another composition of the mineral NKP fertilizer is specified in the tests.

The composition of Si-humate fertilizer (Si-Agro A) used in the tests was 80% brow coal, 19% Microsilica, 1% KOH, prepared by according to the method described in Example 1.

The tests were executed as greenhouse tests. Calcareous soil with pH around 8.3-8.5 was used, unless otherwise stated. In each test the fertilizers was applied by mixing the specified doses into the soil prior to adding seeds.

Example 2. Uptake of Phosphorous

In the following tests the plant uptake of phosphorous (P) was measured. The amount of P was measured on corn (monocot) and sunflower (dicot), in the roots and in shoots (stem and leaves). Each table include a control test showing the uptake after applying 0 wt %, 50 wt %, 70 wt % or 100 wt % of NPK. 100 wt % NPK is equivalent to 300 kg/ha of NPK and 50 wt % is equivalent to 150 kg/ha of NPK. The Si Agro A test shows the uptake of P in roots after applying 300 kg/ha of Si-Agro A and 0 wt %, 50 wt %, 70 wt % or 100 wt % of NPK. 100 wt % and 50 wt % NPK is equivalent to 300 kg/ha and 150 kg/ha of NPK.

The numbers in the column "Increased P in wt %" shows the wt % increase in uptake of P in roots and shoots, respectively. The numbers are always compared to the results obtained with the Control when 0% NPK is applied. As an example we see that application of Si-Agro A (300 kg/ha) and 0% NPK gives a 129 wt % increase in P in the roots (Table 1). This is calculated from the measured mg P/kg of dry roots of 0.58 in the Control and 1.33 in the roots exposed to Si-Agro A

TABLE 2

P uptake in corn roots.

| Treatment of corn | mg P per/kg of dry roots: | | | | Increased P in wt % | | | |
|---|---|---|---|---|---|---|---|---|
| Relative use of NPK: | 0% | 50% | 70% | 100% | 0% | 50% | 70% | 100% |
| Control | 0.58 | 0.78 | 0.83 | 0.94 | 0% | 34% | 43% | 62% |
| Si-Agro A (300 kg/ha) | 1.33 | 1.78 | 1.94 | 2.24 | 129% | 207% | 234% | 286% |

TABLE 3

P uptake in corn shoots.

| Treatment of corn | mg P per kg of dry shoots: | | | | Increased P in wt % | | | |
|---|---|---|---|---|---|---|---|---|
| Relative use of NPK: | 0% | 50% | 70% | 100% | 0% | 50% | 70% | 100% |
| Control | 1.22 | 1.38 | 1.56 | 1.62 | 0% | 13% | 28% | 33% |
| Si-Agro A (300 kg/ha) | 2.28 | 2.48 | 2.86 | 3.25 | 87% | 103% | 134% | 166% |

Figure 1:
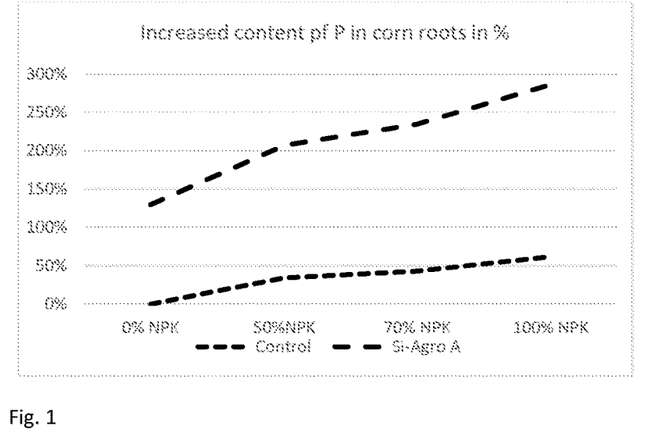
FIG. 1: Test results showing increased uptake of P in corn roots with application of the combined organomineral fertilizer according to the present invention.
Figure 2:
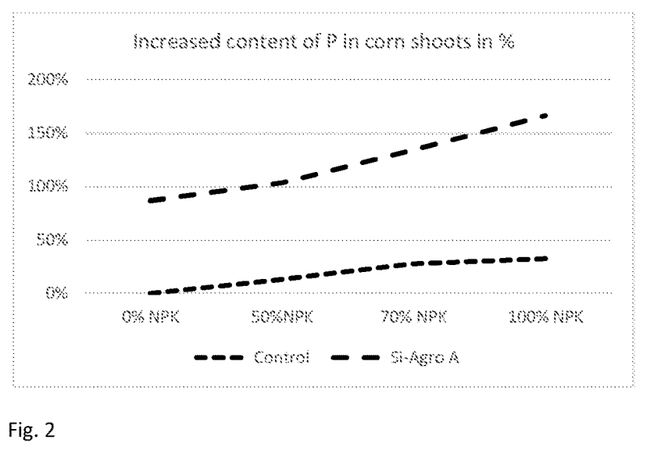
FIG. 2: Test results showing increased uptake of P in corn shoots with application of the combined organomineral fertilizer according to the present invention.

As seen in Tables 2 and 3, and in FIGS. 1 and 2, the content of P in the roots and shoots (stem and leaves) increased by 62% and 33% by applying NPK containing 16% N, 16% P and 16% K (300 kg/ha=100 wt %). With applying 300 kg/ha of Si-Agro A product the P uptake increased with as much as 129% and 87% in roots and shoots, respectively, when 0 wt % of NPK was used. By use of 300 kg/ha Si-Agro A together with 300 kg/ha (100 wt-%) NPK, the P uptake increased as much as 286% and 166%. Using only 150 kg/ha (50 wt %) NPK together with 300 kg/ha Si-Agro A the P uptake was still 207% and 103%, in roots and shoots, respectively, which is about 3 times more than the P uptake when using 300 kg/ha (100%) NPK and no Si-Agro A. It is therefore possible to reduce the amount of NPK by a replacement with the Si-Agro product. There is a strong synergy effect between NPK and Si-Agro A as seen from the result above: 300 kg/ha NPK gives corn roots 62% increase uptake, while 300 kg/ha MS alone gives 129% uptake; theoretically together 191% increase of uptake. By applying both ingredients, 300 kg/ha NPK+300 kg/ha MS the uptake is 286%, or around 50% more than the sum above; a proof of a positive synergy effect of the combination. Such synergy is also present when less NPK is used.

Similar effects are seen in sunflower, and also with similar magnitudes.

TABLE 4

P uptake in sunflower roots.

| Treatment of sunflower | mg P per kg of dry roots: | | | | Increased P in wt % | | | |
|---|---|---|---|---|---|---|---|---|
| Relative use of NPK: | 0% | 50% | 70% | 100% | 0% | 50% | 70% | 100% |
| Control | 0.35 | 0.42 | 0.54 | 0.61 | 0% | 20% | 54% | 74% |
| Si-Agro A (300 kg/ha) | 0.52 | 0.68 | 0.79 | 0.92 | 49% | 94% | 126% | 163% |

TABLE 5

P uptake in sunflower shoots.

| Treatment of sunflower | mg P per kg of dry shoots: | | | | Increased P in wt % | | | |
|---|---|---|---|---|---|---|---|---|
| Relative use of NPK: | 0% | 50% | 70% | 100% | 0% | 50% | 70% | 100% |
| Control | 0.58 | 0.64 | 0.78 | 0.85 | 0% | 10% | 34% | 47% |
| Si-Agro A (300 kg/ha) | 0.79 | 1.03 | 1.28 | 1.45 | 36% | 78% | 121% | 150% |

Figure 3:
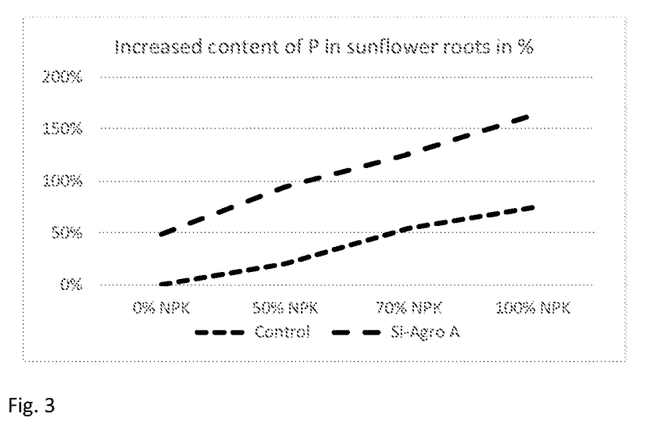
FIG. 3: Test results showing increased uptake of P in sunflower roots with application of the combined organomineral fertilizer according to the present invention.
Figure 4:
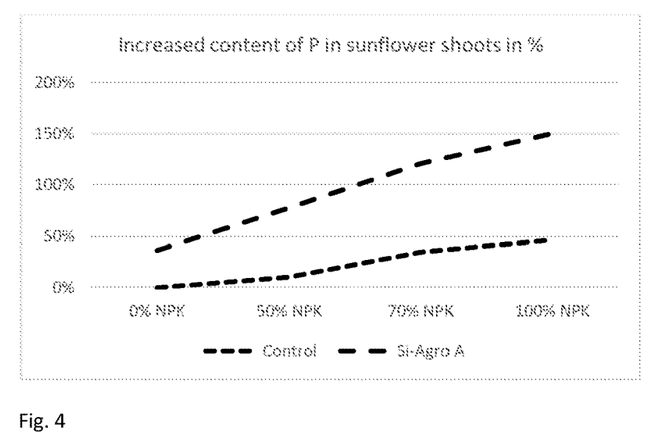
FIG. 4: Test results showing increased uptake of P in sunflower shoots with application of the combined organomineral fertilizer according to the present invention.

As seen in Tables 4 and 5, and in FIGS. 3 and 4, the addition of 300 kg/ha (100%) NPK increased the uptake of P by 74% and 47% in roots and shots, respectively, while the Si-Agro A product alone, without use of NPK, increased the P uptake by 49% and 36%. By combining Si-Agro A with 100% (300 kg/ha) NPK the increase in P uptake was 163% and 150%. Even with only 50% (150 kg/ha) of applied NPK the increase remained higher than using 100% NPK alone; 94% and 78% increase of P uptake. Also for sunflower the amount of NPK can be reduced by replacement with Si-Agro A product.

Example 3. Uptake of Potassium

In the following tests the plant uptake of potassium (K) was measured. The amount of K was measured on corn and sunflower, in the roots and in shoots (stem and leaves). The tables should be read the same way as explained above for the measurements of P uptake.

Figure 5:
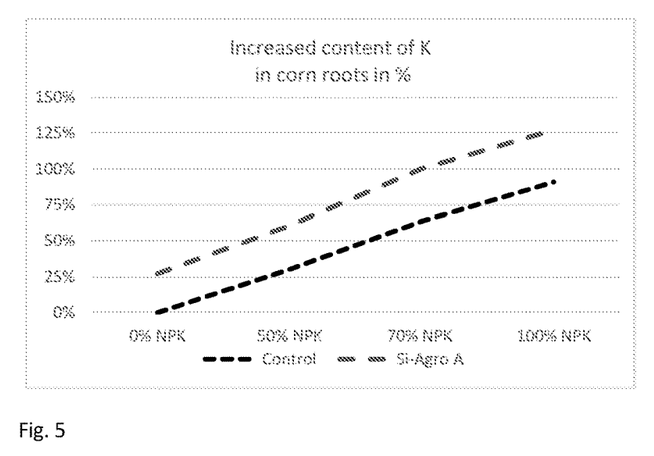
FIG. 5: Test results showing increased uptake of K in corn roots with application of the combined organomineral fertilizer according to the present invention.
Figure 6:
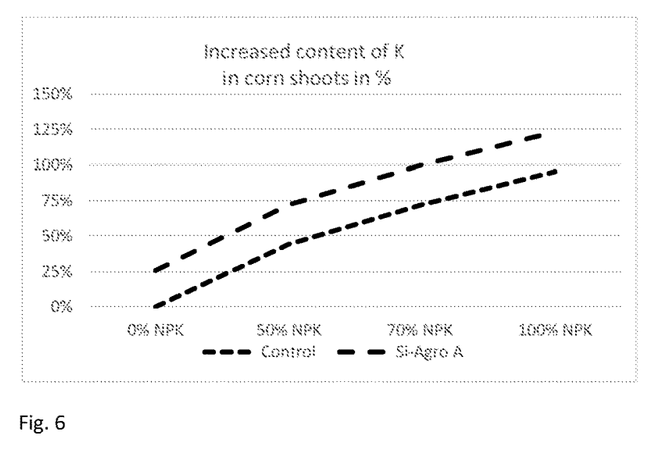
FIG. 6: Test results showing increased uptake of K in corn shoots with application of the combined organomineral fertilizer according to the present invention.

As seen in tables 6 and 7, also refer to FIGS. 5 and 6) NPK usage increased the K content of the corn with 91% in the roots and 95% in the shoots (stems and leaves). Si-Agro A (300 kg/ha) product alone (without NPK) also lead to an increase of K uptake, but much less than the K uptake with NPK addition as the increase was only 27% or 26% in roots and shoots, respectively. In combination with 100% (300 kg/ha) NPK the uptake of K increased with 127% and 123% in roots and shoot, respectively. It is therefore less potential for replacement of NPK with Si-Agro A compared with the results obtained for phosphorous above. By extrapolation of the data the same uptake of K seems to happen with 65% (195 kg/ha) NPK usage in combination with the Si-Agro A product. Also in these cases the increase in K uptake is calculated from the results obtained in Control with 0% NPK applied.

TABLE 6

K uptake in corn roots.

| Treatment of corn | mg K per kg of dry roots | | | | Increase of K in wt % | | | |
|---|---|---|---|---|---|---|---|---|
| Relative usage of NPK | 0% | 50% | 70% | 100% | 0% | 50% | 70% | 100% |
| Control | 0.33 | 0.43 | 0.54 | 0.63 | 0% | 30% | 64% | 91% |
| Si-Agro A (300 kg/ha) | 0.42 | 0.53 | 0.66 | 0.75 | 27% | 61% | 100% | 127% |

TABLE 7

K uptake in corn shoots.

| Treatment of corn | mg K per kg of dry shoots | | | | Increase of K in wt % | | | |
|---|---|---|---|---|---|---|---|---|
| Relative usage of NPK | 0% | 50% | 70% | 100% | 0% | 50% | 70% | 100% |
| Control | 0.43 | 0.62 | 0.74 | 0.84 | 0% | 44% | 72% | 95% |
| Si-Agra A ( 00 kg/ha) | 0.54 | 0.74 | 0.86 | 0.96 | 26% | 72% | 100% | 123% |

TABLE 8

K uptake in sunflower roots.

| Treatment of sunflower | mg K per kg of dry roots | | | | Increase of K in wt % | | | |
|---|---|---|---|---|---|---|---|---|
| Relative usage of NPK | 0% | 50% | 70% | 100% | 0% | 50% | 70% | 100% |
| Control | 0.35 | 0.40 | 0.53 | 0.65 | 0% | 14% | 51% | 86% |
| Si-Agro A (300 kg/ha) | 0.44 | 0.51 | 0.68 | 0.77 | 26% | 46% | 94% | 120% |

TABLE 9

K uptake in sunflower shoots.

| Treatment of sunflower | mg K per kg of dry shoots | | | | Increase of K in wt % | | | |
|---|---|---|---|---|---|---|---|---|
| Relative usage of NPK | 0% | 50% | 70% | 100% | 0% | 50% | 70% | 100% |
| Control | 0.44 | 0.61 | 0.75 | 0.87 | 0% | 39% | 70% | 98% |
| Si-Agro A (300 kg/ha) | 0.54 | 0.74 | 0.86 | 0.96 | 20% | 57% | 93% | 123% |

Figure 7:
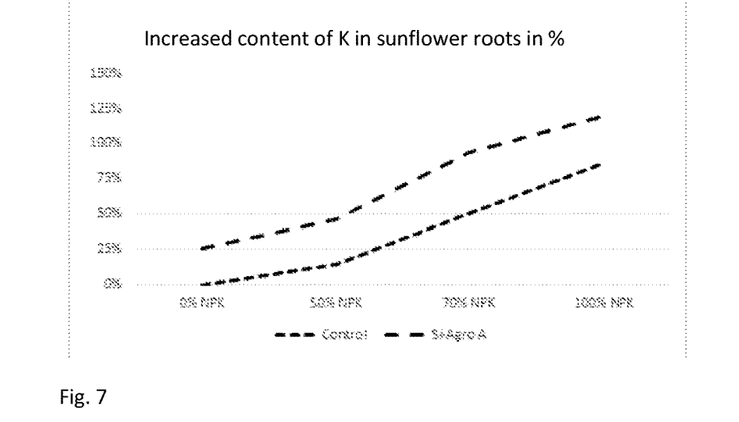
FIG. 7: Test results showing increased uptake of K in sunflower roots with application of the combined organomineral fertilizer according to the present invention.
Figure 8:
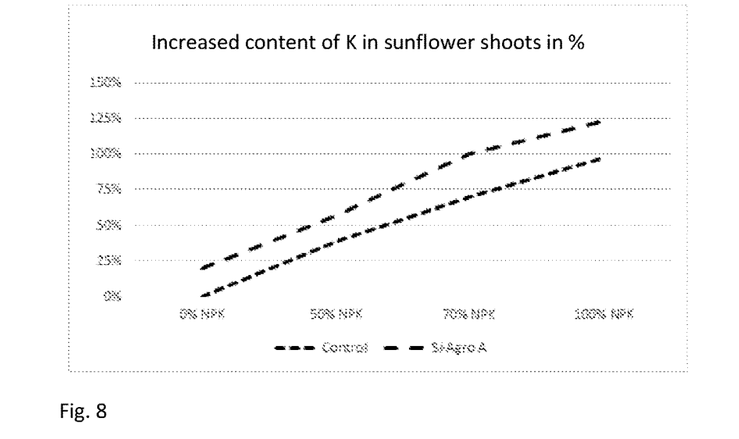
FIG. 8: Test results showing increased uptake of K in sunflower shoots with application of the combined organomineral fertilizer according to the present invention.
Figure 9:
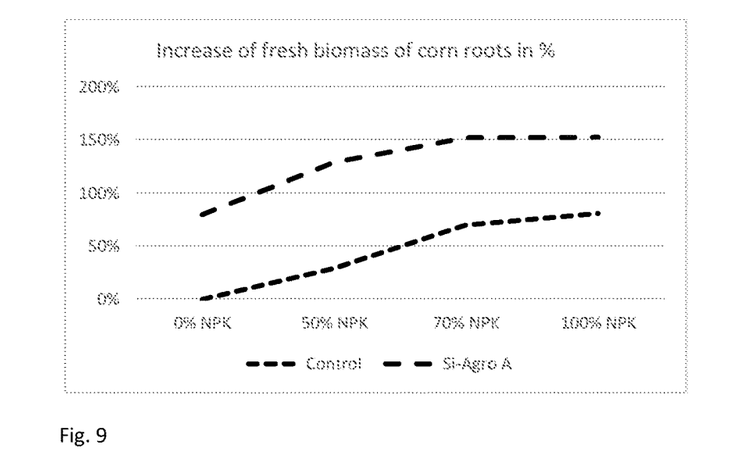
FIG. 9: Test results showing increased fresh biomass of corn roots with application of the combined organomineral fertilizer according to the present invention.
Figure 10:
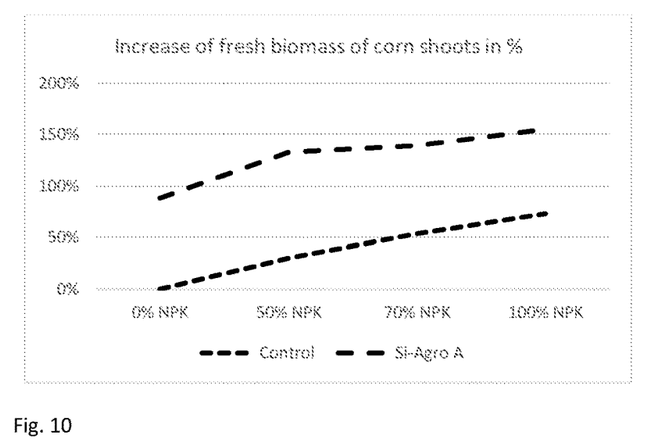
FIG. 10: Test results showing increased fresh biomass of corn shoots with application of the combined organomineral fertilizer according to the present invention.

Similar results were seen for the sunflower where use of NPK increased the K content in the root with 85% and 98% for the stem and leaves (shoots), ref tables 8 and 9, FIGS. 7 and 8. Si-Agro A product alone (without NPK) increased the uptake with 26% and 20% for roots and shoots, respectively. Si Agro A in combination with 100% (300 kg/ha) NPK, resulted in an uptake of 120% and 123% compared to Control (0% NPK). By extrapolation of the data it seems like an amount of around 65% NPK in combination with 300 kg/ha of Si-Agro A product applied on the sunflowers, will give a similar uptake of K as when 100% of NPK is applied alone (no Si-Agro).

Using only 50% NPK together with Si-Agro will result in lower uptake of K than using 100% NPK. But with the much higher uptake for P for a 50% reduction of NPK may compensate for the somewhat less K and thereby still result in a satisfactory biomass growth. This may open for a reformulated NPK, resulting in less application of artificial fertilizers.

Example 4. Examples of Increased Biomass

Greenhouse tests for growth of corn root and shoot biomass were performed.

TABLE 10

Biomass of corn roots.

| Treatment of corn Biomass gram per plant. | Biomass of Roots: | | | | Increased biomass in wt % | | | |
|---|---|---|---|---|---|---|---|---|
| Relative use of NPK: | 0% | 50% | 70% | 100% | 0% | 50% | 70% | 100% |
| Control | 4.54 | 5.87 | 7.73 | 8.22 | 0% | 29% | 70% | 81% |
| Si-Agro A (300 kg/ha) | 8.17 | 10.39 | 11.44 | 11.46 | 80% | 129% | 152% | 152% |

TABLE 11

Biomass of corn shoots.

| Treatment of corn Biomass gram per plant | Biomass of Shoots: | | | | Increased biomass in wt % | | | |
|---|---|---|---|---|---|---|---|---|
| Relative use of NPK: | 0% | 50% | 70% | 100% | 0% | 50% | 70% | 100% |
| Control | 4.78 | 6.22 | 7.34 | 8.27 | 0% | 30% | 54% | 73% |
| Si-Agro A (300 kg/ha) | 8.99 | 11.13 | 11.44 | 12.19 | 88% | 133% | 139% | 155% |

By use of NPK the root biomass increased by 81%, see table 10. Less use of NPK gave relatively less biomass. Use of Si-Agro A gave similar results (80%) without the usage of any NPK. With use of NPK the root biomass increased by 152%, almost the double of the NPK alone. By reducing the NPK content, replaced with Si-Agro A product, the increase of biomass was still more than 50% higher than for using NPK alone. Evaluation of corn shoot (stem and leaves) biomass data gave similar and even better results, see table 11. Even with 50% reduction of NPK and replaced with Si-Agro A product the biomass was 80% higher than for using full NPK alone.

TABLE 12

Biomass of sunflower roots.

| Treatment of sunflower Biomass gram per plant | Biomass of Roots: | | | | Increased biomass in wt % | | | |
|---|---|---|---|---|---|---|---|---|
| Relative use of NPK: | 0% | 50% | 70% | 100% | 0% | 50% | 70% | 100% |
| Control | 2.28 | 3.65 | 3.78 | 4.76 | 0% | 60% | 66% | 109% |
| Si-Agro A (300 kg/ha) | 3.61 | 6.07 | 5.23 | 6.2 | 58% | 166% | 129% | 172% |

TABLE 13

Biomass of sunflower shoots.

| Treatment of sunflower Biomass gram per plant | Biomass of Shoots: | | | | Increased biomass in wt % | | | |
|---|---|---|---|---|---|---|---|---|
| Relative use of NPK: | 0% | 50% | 70% | 100% | 0% | 50% | 70% | 100% |
| Control | 1.86 | 2.36 | 3.35 | 3.79 | 0% | 27% | 80% | 104% |
| Si-Agro A (300 kg/ha) | 2.76 | 4 | 4.97 | 5.31 | 48% | 115% | 167% | 185% |

Figure 11:
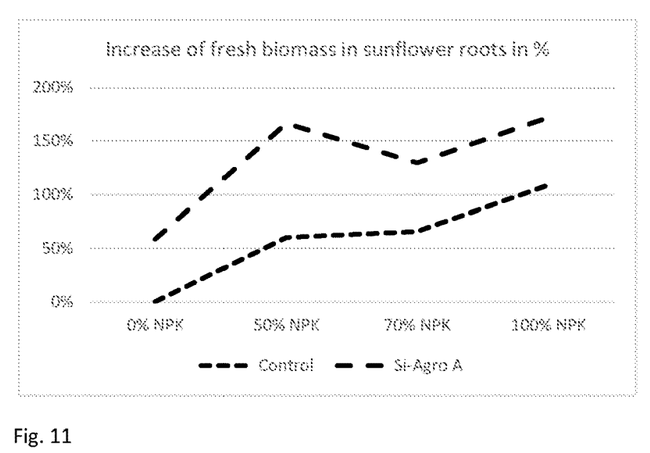
FIG. 11: Test results showing increased fresh biomass of sunflower roots with application of the combined organomineral fertilizer according to the present invention.
Figure 12:
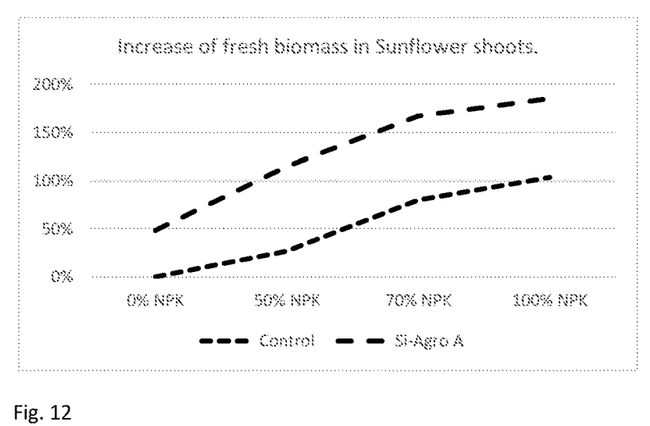
FIG. 12: Test results showing increased fresh biomass of sunflower shoots with application of the combined organomineral fertilizer according to the present invention.

Example for growth of sunflower gave similar result. By reducing the NPK with 50% the root biomass was still 66% higher when applied with the Si-Agro A product compared with using normal rate of NPK alone, see table 12 and FIG. 11. For the stem and leaves the biomass was only slightly higher (10% more) for the 50% NPK reduction when replaced with the Si-Agro A product compared with normal rate of biomass, see table 13, and FIG. 12.

Example 5. Uptake of Nitrogen (N)

The use of Si-Agro has a strong impact on the plants uptake of Nitrogen. Nitrogen is vital because it is a major component of chlorophyll, the compound by which plants use sunlight energy to produce sugars from water and carbon dioxide (i.e. photosynthesis). It is also a major component of amino acids, the building blocks of proteins. Without proteins, plants wither and die. Some proteins act as structural units in plant cells while others act as enzymes, which is crucial for numerus biochemical reactions. Nitrogen is a component in the energy-transfer compounds, such as ATP (adenosine triphosphate). ATP allows cells to conserve and use the energy released in metabolism. Finally, nitrogen is a significant component of nucleic acids such as DNA, the genetic material that allows cells (and eventually whole plants) to grow and reproduce.

The tables below presents the uptake of Nitrogen as mg $NO_3^-$ per kg dry mass of roots or leaves in apoplast and symplast of barley and pea exposed to the following treatments:

No NPK and no Si-Agro; Control without NPK application
    300 kg/ha of NPK and no Si-Agro; Control with NPK application
    No NPK and 300 kg/ha of Si-Agro A; Si-Agro A without NPK application
    300 kg/ha of NPK and 300 kg/ha of Si-Agro A; Si-Agro A with NPK application

TABLE 14

Nitrogen uptake in Barley.

| Barley | Apoplast (mg $NO_3$/kg dry weight) | | Symplast (mg $NO_3$/kg dry weight) | |
|---|---|---|---|---|
| Treatments | Roots | Leaves | Roots | Leaves |
| Without NPK application | | | | |
| Control | 2200 | 1330 | 1526 | 2920 |
| Si-Agro A | 3986 | 2260 | 2377 | 4306 |
| With NPK application | | | | |
| Control | 3195 | 1470 | 2560 | 4370 |
| Si-Agro A | 4288 | 2240 | 3585 | 5964 |

TABLE 15

Nitrogen uptake in Pea.

| Pea | Apoplast (mg $NO_3$/kg dry weight) | | Symplast (mg $NO_3$/kg dry weight) | |
|---|---|---|---|---|
| Treatments | Roots | Leaves | Roots | Leaves |
| Without NPK application | | | | |
| Control | 695 | 1350 | 1391 | 2800 |
| Si-Agro A | 1865 | 2368 | 3330 | 3297 |

TABLE 15-continued

Nitrogen uptake in Pea.

| Pea | Apoplast (mg NO$_3$/kg dry weight) | | Symplast (mg NO$_3$/kg dry weight) | |
|---|---|---|---|---|
| Treatments | Roots | Leaves | Roots | Leaves |
| With NPK application | | | | |
| Control | 979 | 1620 | 1158 | 2600 |
| Si-Agro A | 2310 | 2096 | 2943 | 3975 |

Application of Si Agro A to Barley resulted in a 70-80% increase of NO$_3^-$ content in the apoplast (both roots and leaves), and a 47-56% of NO$_3^-$ content in symplast. With application of 300 kg/ha of NPK and no Si-Agro to the Barley, the content of NO$_3^-$ in apoplast and symplast were still less or similar compared to when Si Agro was applied alone without NPK. Combined application of NPK and Si-Agro A, resulted in a significant increase in NO$_3^-$ content in both apoplast and symplast (roots and leaves), see table 14.

Similar observations were made for the same treatments conducted on Pea, see table 15. This proved that with application of Si-Agro A, the amount of NPK can be reduced, while the amount of NO$_3^-$ taken up by the plant remains the same.

Example 5. Test on Production Fields for Paddy Rice in Hunan, China

2017, $1^{st}$ season March-July, Si-Agro was tested in several production test fields for paddy rice in China. Heavy metal had contaminated the test fields, which also had Si-depleted soil.

Each treatment had 3 replications of 10 m$^2$ each and 16 rice-plants per m$^2$; totally 480 rice plants.

Fertilizer was applied; Urea with 150 kg/ha N; Superphosphate with 135 kg P; and KCl with 135 kg/ha as K. This dosage referred to as 100% NPK usage. A 70% NPK dosage was also used. Both referred to as references.

Si-Agro A was applied in a separate field in combination with 70% NPK usage. Due to the prime target with heavy metal reduction in the rice for this particular test, 1000 kg Si-Agro A was used in order to react with and form immobile complex minerals of the heavy metal. Results in table under.

TABLE 16

Weight of rice grains, absolute crop yields (ton/ha) and relative crop yields (%).

| | Yield | 70% NPK ton/ha | 100% NPK ton/ha | 70% NPK Effect in % | 100% NPK Defined 100% |
|---|---|---|---|---|---|
| Field 1 | References | 3.55 | 4.21 | 84% | 100% |
| | + Si-Agro A | 5.16 | | 123% | |
| Field 2 | References | 4.82 | 5.25 | 92% | 100% |
| | + Si-Agro A | 5.57 | | 106% | |
| Field 3 | References | | 7.03 | | 100% |
| | + Si-Agro A | 7.23 | | 103% | |

By replacing 25% of the NPK with Si-Agro, the productivity was maintained and yield was even 3-23% higher than using full dosage of NPK. It demonstrates in actual usage that Si-Agro can replace more than 25% of the fertilizer, thereby reducing the amount of NPK.

Examples 6. Rice Field Trials with Si-Agro a in Hunan, China

The fertilizer according to the present invention was tested in full scale field trials in China by Hunan Institute of Economic Geography, using 3 different field locations (Xiangtan; Zhuzhou, Xiangyin). The field tests were executed during $2^{nd}$ season (autumn season) of 2017. The test was benchmarked against use of normal dosage of NPK (referred to as 100%), against use of 70% of normal dosage of NPK and the test with a fertilizer according to the present invention, where Si-humate fertilizer, denoted "Si-Agro A", was used together with 70% NPK. Normal dosage of NPK was: N (urea)=150 kg N/ha, P (superphosphate)=135 kg P/ha and K (KCl)=135 kg K/ha) one day before seedling, and added with 30 kg N/ha one week after seedling. The amount of Si-humate fertilizer was 1000 kg/ha. In this test the relative amount of Si-humate fertilizer was high, as there was a desire to bind Cd in soil, thus reducing the uptake of Cd in the rice grains. Following results for the rice grain yields (in kg/ha) for the three test fields are seen in table 17. Yield for normal dosage of NPK is set to 100% and the other yield data compared accordingly in %.

TABLE 17

The result of yield of rice grains

| Field | Xiangtan | Zhozhou | Xiangyin | Average |
|---|---|---|---|---|
| 100% NPK | 100% | 100% | 100% | 100% |
| 70% NPK | 92.50% | 76.10% | 85.10% | 84.57% |
| 70% NPK+ Si Agro B | 100.90% | 104.90% | 99.00% | 101.60% |

As demonstrated, by reducing NPK with 30%, and adding Si Agro A, the yield can be maintained at 10% above the level as using normal dosage of NPK. One field even increased the yield with 36.7%.

A purpose for these field tests was to reduce uptake of heavy metal, especially Cadmium. Results are shown below in table 18.

TABLE 18

Uptake of Cd in rice grains in % compared to normal usage of NPK.

| Field | Xiangtan | Zhuzhou | Xiangyin | Average |
|---|---|---|---|---|
| 100% NPK | 100% | 100% | 100% | 100% |
| 70% NPK | 93.00% | 59.00% | 108.00% | 86.67% |
| 70% NPK+ Si Agro A | n.a | 38.00% | 49.00% | 43.50% |

As demonstrated, by reducing use of NPK with 30%, and adding Si Agro A, the uptake of cadmium was reduced with more than 55%.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. A combined organomineral NPK—Si-humate fertilizer comprising at least one particulate mineral NPK fertilizer, which comprises at least one nutrient compound of nitrogen, phosphorous or potassium; and a particulate humic substance based silicon fertilizer, comprising chelates of monosilicic acid-humate compounds, wherein the ratio of the at least one particulate mineral NPK fertilizer to the particulate humic substance based silicon fertilizer is from 10:90 to 90:10, based on a total dry weight of the at least one nutrient compound of nitrogen, phosphorous or potassium contained in the at least one NPK fertilizer, and the humic substance based silicon fertilizer.

2. The combined organomineral NPK—Si-humate fertilizer according to claim 1, wherein the ratio of the particulate mineral NPK fertilizer to the humic substance based silicon fertilizer is from 20:80 to 80:20, based on the total dry weight of the at least one nutrient compound of nitrogen, phosphorous or potassium contained in the at least one NPK fertilizer, and the humic substance based silicon fertilizer.

3. The combined organomineral NPK—Si-humate fertilizer according to claim 1, wherein the mineral NPK fertilizer contains at least one of the following nutrient compounds:
 (a) nitrogen (N), in the form of nitrate ($NO_3^-$), ammonium ($NH_4^+$) and/or urea ($CO(NH_2)_2$),
 (b) phosphorous (P), in the form of phosphate ($PO_4^{3-}$), hydrogen phosphate ($HPO_4^{2-}$) and/or dihydrogen phosphate ($H_2PO_4^-$), and/or
 (c) potassium (K), in the form of potassium salt ($K^+$).

4. The combined organomineral NPK—Si-humate fertilizer according to claim 1, wherein the humic substance based silicon fertilizer is obtained by incubation of an aqueous suspension comprising 45-90% by weight of a humic acid-containing raw material, 5-50% by weight of amorphous silica, and 0.5-10% by weight of an alkali, the amounts being based on the total weight of the dry components, followed by drying until a residual moisture of less than 15% by weight.

5. The combined organomineral NPK—Si-humate fertilizer according to claim 4, wherein the humic substance based silicon fertilizer comprises undissolved residues of the humic acid-containing raw material and undissolved residues of the amorphous silica.

6. The combined organomineral NPK—Si-humate fertilizer according to claim 4, wherein the humic acid-containing raw material is selected from the group consisting of coal, charcoal, brown coal, peat, humic soil, and a mixture of thereof.

7. The combined organomineral NPK—Si-humate fertilizer according to claim 4, wherein the amorphous silica is selected from the group consisting of microsilica, diatomaceous earth, rice husk ash, zeolites, and a mixture thereof.

8. The combined organomineral NPK—Si-humate fertilizer according to claim 4, wherein the alkali is selected from the group consisting of an alkali metal hydroxide, an alkaline earth metal hydroxide and a mixture thereof.

9. The combined organomineral NPK—Si-humate fertilizer product according to claim 1, wherein the particulate mineral NPK fertilizer is in the form of a compound fertilizer containing nutrient compounds of
 N, P and K;
 N and P; P and K; and/or N and K; and/or
 in the form of single nutrient fertilizer containing compounds of N, P and/or K.

10. The combined organomineral NPK—Si-humate fertilizer product according to claim 1, wherein the at least one mineral NPK fertilizer is in the form of granules, prills, extrudates, pellets or agglomerates.

11. The combined organomineral NPK—Si-humate fertilizer product according to claim 1, wherein the content of nitrogen nutrient in the NPK fertilizer is up to about 46 weight % in terms of elemental N.

12. The combined organomineral NPK—Si-humate fertilizer product according to claim 1, wherein the content of phosphorous nutrient in the NPK fertilizer is up to 55 weight % in terms of $P_2O_5$.

13. The combined organomineral NPK—Si-humate fertilizer product according to claim 1, wherein the contents of potassium nutrient in the NPK fertilizer is up to 62 weight % in terms of $K_2O$.

14. The combined organomineral NPK—Si-humate fertilizer product according to claim 1, wherein the NPK—Si fertilizer product further comprises other nutrients selected from the group consisting of calcium (Ca), sulphur (S) and magnesium (Mg), and/or micronutrients selected from the group consisting of zinc (Zn), copper (Cu), iron (Fe), boron (B) and molybdenum (Mo).

15. The combined organomineral NPK—Si-humate fertilizer according to claim 1, wherein the organomineral NPK—Si-humate fertilizer is in the form of a physical mixture or blend of the particulate mineral NPK fertilizer and the particulate humic substance based silicon fertilizer.

16. The combined organomineral NPK—Si-humate fertilizer according to claim 1, wherein the organomineral NPK—Si-humate fertilizer is in the form of granules, prills, pellets, extrudates or agglomerates.

17. A method for producing the combined organomineral NPK—Si-humate fertilizer according to claim 1, comprising
 providing at least one particulate NPK mineral fertilizer, which comprises at least one nutrient compound of nitrogen, phosphorous or potassium;
 providing a particulate humic substance based silicon fertilizer, which is obtained by preparing a suspension comprising 45-90% by weight of a humic acid-containing raw material, 5-50% by weight of amorphous silica, and 0.5-10% by weight of an alkali, the amounts being based on the total weight of the dry components, incubating the aqueous suspension, and thereafter drying the incubated suspension until a residual moisture of less than 15% by weight, and
 mixing the said at least one particulate NPK mineral fertilizer and the said particulate humic substance based silicon fertilizer, wherein the at least one particulate mineral NPK fertilizer and particulate humic substance based silicon fertilizer are provided in a ratio such that the ratio of the at least one particulate NPK mineral fertilizer to the said particulate humic substance based silicon fertilizer is from 10:90 to 90:10, based on the total dry weight of the at least one nutrient compound of nitrogen, phosphorous or potassium contained in the at least one NPK fertilizer, and the humic substance based silicon fertilizer.

18. The method according to claim 17, wherein the ratio of the at least one particulate mineral NPK fertilizer to the said particulate humic substance based silicon fertilizer is from 20:80 to 80:20, based on the total dry weight of the at least one nutrient compound of nitrogen, phosphorous or potassium contained in the at least one NPK fertilizer, and the humic substance based silicon fertilizer.

19. The method according to claim 17, wherein the humic acid-containing raw material is selected from the group consisting of coal, charcoal, brown coal, peat, humic soil, and a mixture of thereof.

20. The method according to claim 17, wherein the amorphous silica is selected from the group consisting of microsilica, diatomaceous earth, rice husk ash, zeolites, and a mixture thereof.

21. The method according to claim 17, wherein the alkali is selected from the group consisting of an alkali metal hydroxide, an alkaline earth metal hydroxide and a mixture thereof.

22. The method according to claim 17, wherein the at least one particulate mineral NPK fertilizer contains at least one of the following nutrient compounds:
   (a) nitrogen (N), in the form of a nitrate ($NO_3^-$), an ammonium ($NH_4^+$) and/or urea ($CO(NH_2)_2$),
   (b) phosphorous (P), in the form of a phosphate ($PO_4^{3-}$), hydrogen phosphate ($HPO_4^{2-}$) and/or a dihydrogen phosphate ($H_2PO_4^-$), and
   (c) potassium (K), in the form of a potassium salt ($K^+$).

23. The method according to claim 17, wherein the least one particulate mineral NPK fertilizer and the particulate humic substance based silicon fertilizer is mixed until a homogenous mixture is obtained.

24. A method for supplying nutrients and/or soil conditioners to agricultural or greenhouse soil, comprising applying the combined organomineral NPK—Si-humate fertilizer according to claim 1.

25. The method for supplying nutrients and/or soil conditioners to agricultural or greenhouse soil, comprising applying a combined organomineral NPK—Si-humate fertilizer according to claim 1, where the at least one particulate mineral NPK fertilizer, which comprises at least one nutrient compound of nitrogen, phosphorous or potassium; and the particulate humic substance based silicon fertilizer, comprising chelates of monosilicic acid-humate compounds, are applied as separate constituents.

* * * * *